US009183275B2

(12) United States Patent
Guo et al.

(10) Patent No.: US 9,183,275 B2
(45) Date of Patent: Nov. 10, 2015

(54) DATA PROFILING METHOD AND SYSTEM (75) Inventors: HongLei Guo, Beijing (CN); Zhi Li Guo, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 12/015,871

(22) Filed: Jan. 17, 2008

(65) Prior Publication Data

US 2008/0195589 A1    Aug. 14, 2008

(30) Foreign Application Priority Data

Jan. 17, 2007    (CN) .......................... 2007 1 0001953

(51) Int. Cl.
*G06F 17/30*  (2006.01)
*G06F 17/27*  (2006.01)

(52) U.S. Cl.
CPC ........ *G06F 17/30616* (2013.01); *G06F 17/277* (2013.01)

(58) Field of Classification Search
CPC .................... G06F 17/30749; G06F 17/30592; G06F 17/271; G06F 17/2785; G06F 17/30303; G06F 19/28
USPC ............................ 707/999.001, 602, 693, 739
See application file for complete search history.

(56) References Cited

U.S. PATENT DOCUMENTS

| 6,629,097 | B1 | | 9/2003 | Keith | |
| 7,085,771 | B2 | | 8/2006 | Chung | |
| 7,383,172 | B1 | * | 6/2008 | Jamieson | 704/9 |
| 7,447,665 | B2 | * | 11/2008 | Murray | 706/20 |
| 7,487,151 | B2 | * | 2/2009 | Yamamoto | 1/1 |
| 7,890,514 | B1 | * | 2/2011 | Mohan et al. | 707/748 |
| 8,745,093 | B1 | * | 6/2014 | Zhang et al. | 707/797 |
| 2004/0083199 | A1 | | 4/2004 | Govindugari | |
| 2005/0102325 | A1 | * | 5/2005 | Gould et al. | 707/104.1 |
| 2005/0143971 | A1 | * | 6/2005 | Burstein et al. | 704/4 |
| 2005/0240354 | A1 | * | 10/2005 | Mamou et al. | 702/19 |
| 2007/0074176 | A1 | * | 3/2007 | Cao et al. | 717/130 |
| 2008/0120257 | A1 | * | 5/2008 | Goyal et al. | 706/12 |
| 2008/0162520 | A1 | * | 7/2008 | Sarwar et al. | 707/101 |
| 2008/0162561 | A1 | * | 7/2008 | Naphade et al. | 707/104.1 |

FOREIGN PATENT DOCUMENTS

| CN | 1669029 | 9/2005 |
| WO | 2006026702 | 3/2006 |

* cited by examiner

*Primary Examiner* — Mariela Reyes
*Assistant Examiner* — Soheila Davanlou
(74) *Attorney, Agent, or Firm* — Janice Kwon; Anne Vachon Dougherty (57) ABSTRACT

A data profiling method and system for reading an input data entry set and labeling semantic fragments according to fragments of data entries and semantic features of fragments and, based on the labeled semantic fragments performing a semantic-level data analysis of the input data entry set to obtain analysis results. According to the method and system of the present invention, it is able to obtain better data analysis of free text and make corresponding statistics and analysis of free-text data entry sets according to semantics.

7 Claims, 5 Drawing Sheets

| Address Data |
|:---:|
| □ □ A1006 |
| □ □ □ □ □ 19-1-702/ 13156385715 |
| □ □ □ □ □ □ □ 20-3-201/ 5919626 |
| □ □ □ □ □ □ □ □ |
| □ □ 157 □ □ □ 2-2-202 |
| □ □ □ 24□ 13608987639 |
| □ □ □ □ □ □ □ □ □ □ □ □ <br> □ □ □ □ □ □ □ □ □ □ □ |
| □ □ □ □ □ □ □ 6□ □ □ □ 10 <br> □ 1012□ □ □ □ □ □ □ |
| □ □ □ □ □ □ □ □ □ 13□ □ □ <br> □ B□ 306□ □ □ □ □ □ □ □ |
| □ □ □ □ □ □ □ □ □ □ □ □ <br> □ □ □ □ □ □ □ □ □ □ □ |
| 13156385715 |
| □ □ 59-2-2-203 |
| □ □ |
| □ □ □ |
| … … |

Fig.4

```
┌─────────────────────────────────────────┐
│       Symbol-level Data Profiling       │
├─────────────────────────────────────────┤
│ Word-frequency Statistics▯              │
│ ▯ ▯ 5                                   │
│ ▯ ▯ ▯ 4                                 │
│ ▯ ▯ 1                                   │
│ ▯ ▯ 1                                   │
│ ▯ ▯ 7                                   │
│ ▯ ▯ ▯ 1                                 │
│ … …                                     │
├─────────────────────────────────────────┤
│ Number String Statistics▯               │
│ Counts of Number String▯ 13             │
│ Lengths of Number String▯ … …           │
├─────────────────────────────────────────┤
│ Symbol-level Pattern Analysis▯          │
│ 1▯ Characters+digit+symbol+digit▯ 6     │
│ 2▯ Pure text string▯ 5                  │
│ 3▯ Pure numerical string▯ 1             │
│ 4▯ Characters+digits▯ 2                 │
└─────────────────────────────────────────┘
```

Prior Art

Fig.5(a)

| Semantic-level Data Profiling |
|---|
| Semantic unit statistics▯<br>Counts of Street:9<br>Counts of Building:5<br>Counts of StreetNo:8<br>Counts of org:5<br>Counts of resident:3<br>Counts of persons:4<br>Counts of contact numbers:4<br>… … |
| Numerical Unit statistics:<br>Counts of phone number:1<br>Length of phone number:7<br>Counts of mobile number:3<br>Length of mobile number:11 |
| Semantic-level Pattern Analysis▯<br>0▯ Semantic Validate Address▯ 8<br>1▯ Pure location information▯ 3<br>2▯ Pure person information▯ 2<br>3▯ Mixture Data Types<br>  3.1 Loc + org▯ 3<br>  3.2 Loc + org + person▯ 2<br>  3.3 Loc + contact number▯ 3<br>4▯ Loc structure statistics<br>  4.1 building▯ 1<br>  4.2 city + street + streetNo▯ 1<br>  4.3 city + district + street + streetNo▯ 4<br>  4.4 street + streetNo▯ 3▯ … …<br>5▯ Org structure statistics▯<br>  5.1 unique name + industry + type▯ 4<br>  5.2 unique name + industry + type + depart▯ 1<br>… … |

Fig.5(b)

DATA PROFILING METHOD AND SYSTEM

FIELD OF THE INVENTION

The present invention generally relates to the field of data profiling, and more particularly, to a method and system for improving the result of data profiling.

BACKGROUND OF THE INVENTION

Data profiling relates to the analysis of an input data entry set with respect to statistical properties of data distribution, quality of data, and so on. It is the first essential step in the data integration process. Such data profiling is needed to help understand new data sources during data integration and data cleansing. Data profiling can provide more detailed information, such as reports on the numbers of valid addresses and fields with missing information. Data profiling reports can be used to identify problems, such as bad files, and to identify new data values that need to be further researched and possibly accommodated.

Data profiling is usually a labor-intensive, resource-devouring, error-prone process. In recent years, some data profiling systems have been developed that can dramatically reduce the time of data profiling from months to weeks to even days. These data profiling systems provide good support for new enterprise applications, data warehouse projects etc.

All of the existing data profiling methods include: pattern analysis for determining whether or not data values in a field or fields match the expected pattern or structure; column analysis for identifying statistical properties of data records, such as the number of null values contained in data, maximum/minimum values of data, mean values, standard deviation etc.; domain analysis for determining whether or not specific data values are acceptable or fall within an acceptable range of values. For example, data concerning "gender" must be "male" or "female" only, and other data values are unacceptable.

However, the above existing data profiling systems provide only symbol-level shallow data analysis. For example, they analyze some characters, words and digits of the address of an input data entry, but they do not know the meaning, namely semantics of the analyzed characters, phrases and digits. In practice, various free-text data, e.g. organization name, customer address etc., also need data profiling in many data integration and data cleansing applications. Especially, a plurality of free-text data entries comprises the mixture of various data types, e.g. address, organization name, person name, phone number etc.

SUMMARY OF THE INVENTION

The present invention proposes a data profiling method that can make effective data profiling to obtain the distribution of semantic structure for various data entry sets, especially free-text data entry sets, for example, make an analysis of an address according to semantic-independent parts such as country, province, city and district to obtain the corresponding data quality analysis results and the statistics results having semantic features.

It is an object of the present invention to provide a data profiling method and system for providing data analysis results which are easier to understand and use, as well as reducing the required costs and resources.

According to a first aspect of the present invention, a data profiling method is proposed, which comprises a data processing step of reading an input data entry set and labeling semantic fragments of the data entries according to the fragments and semantic features of the fragments; and a data analyzing step of, based on the labeled semantic fragments, performing a semantic-level data analysis on the input data entry set to obtain analysis results.

According to a second aspect of the present invention, a data profiling system is proposed, which comprises data processing means for reading an input data entry set and labeling semantic fragments according to the fragments of data entries and semantic features of the fragments; and data analyzing means connected with the data processing means and for, based on the labeled semantic fragments from the data processing means, performing a semantic-level data analysis on the input data entry set to obtain analysis results.

According to a third aspect of the present invention, a computer program product is proposed, which comprises program codes for reading an input data entry set and labeling semantic fragments according to the fragments of data entries and semantic features of fragments; and based on the labeled semantic fragments, performing a semantic-level data analysis on the input data entry set to obtain analysis results.

According to the present invention, it is possible to perform a better data profiling on free text and perform the corresponding statistics and analysis on a free-text data entry set.

BRIEF DESCRIPTION ON THE DRAWINGS

As the present invention is better understood, other objects and effects of the present invention will become more apparent and easy to understand from the following description, taken in conjunction with the accompanying drawings wherein.

Like reference numerals designate the same, similar, or corresponding features or functions throughout the drawings.

DESCRIPTION OF THE PREFERRED EMBODIMENTS

Several terms involved in the present invention need to be explained first before describing embodiments of the present invention: data profiling relates to analyzing the statistical properties of distribution and quality of the input data. Semantic fragment refers to a token sequence which represents an independent semantic concept and information unit. Named entity refers to a named information unit about which semantics is uniquely determined, such as person name, location, organization name, technical term, time expression, mathematical expression, etc.

Hereinafter, the preferred embodiments of the present invention will be described in detail.

Figure 1:
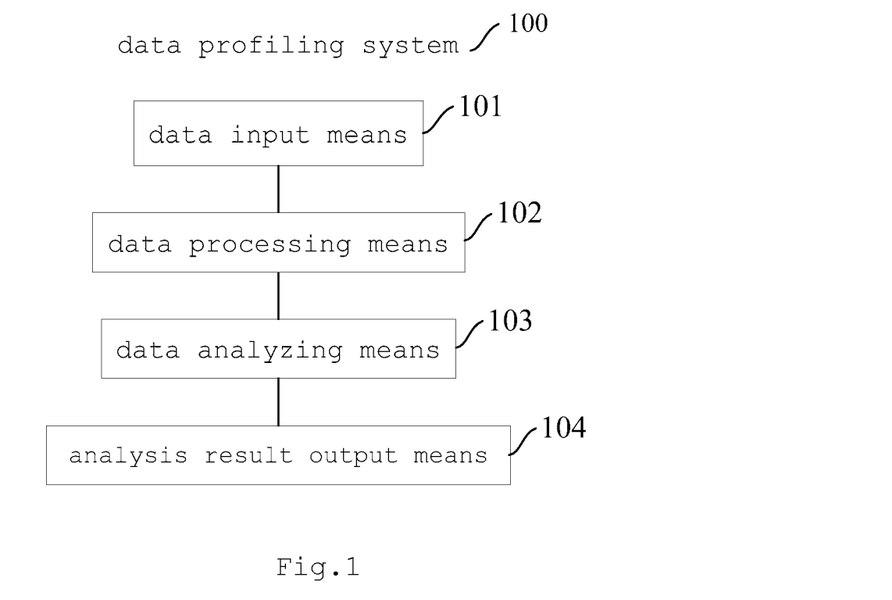
FIG. 1 illustrates an overall block diagram of a data profiling system according to an embodiment of the present invention.

FIG. 1 illustrates an overall block diagram of a data profiling system 100 according to the present invention. The data profiling system analyzes an input data entry set, especially a free-text data entry set, and finally obtains a semantic data profiling report. As depicted in FIG. 1, data profiling system 100 comprises data input means 101, data processing means 102, data analyzing means 103 and analysis result output means 104.

Data input means 101 is for inputting a data entry set to be profiled, and the data entry set may be free text comprising various data types and the mixture thereof, such as address, organization name, person name, phone number or other mixture text.

Data processing means 102 is connected with data input means 101 and is for extracting semantic features of input data from data input means 101 and semantically labeling semantic fragments in a data entry using clustering-based labeling mechanism.

Figure 2:
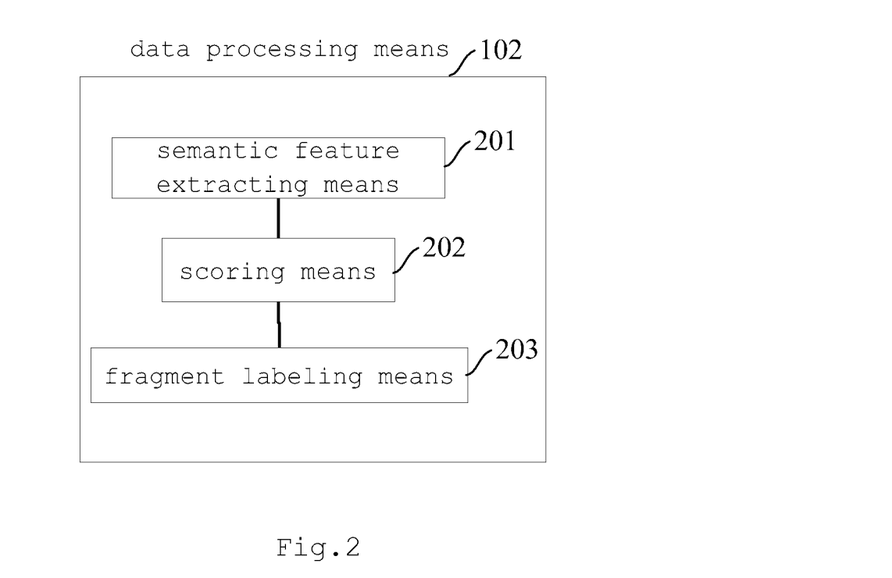
FIG. 2 illustrates a block diagram of data processing means of a data profiling system according to an embodiment of the present invention.

In the present embodiment, as depicted in FIG. 2, data processing means 102 further comprises: semantic feature extracting means 201 connected with data input means 101 and for extracting fragments of the input data entry from data input means 101 and the semantic features of the fragments; scoring means 202 connected with semantic feature extracting means 201 and for scoring information grain of the fragments of each data entry extracted by semantic feature extracting means 201; and fragment labeling means 203 connected with scoring means 202 and for labeling semantic fragments in each data entry according to the information grain scores of the fragments provided by scoring means 202.

Data analyzing means 103 is connected with fragment labeling means 203 in data processing means 102 and performs a statistic analysis on the data quality and semantic distribution on the data entry and the labeled internal semantic fragments from fragment labeling means 203 according to user's requirements.

Analysis result output means 104 is connected with data analyzing means 103 and is for outputting an analysis result of data analyzing means 103, providing a semantic data profiling analysis report, such as the expected semantic patterns, unexpected semantic patterns, semantic pattern frequency, invalid semantic construction, and so on.

Figure 3:
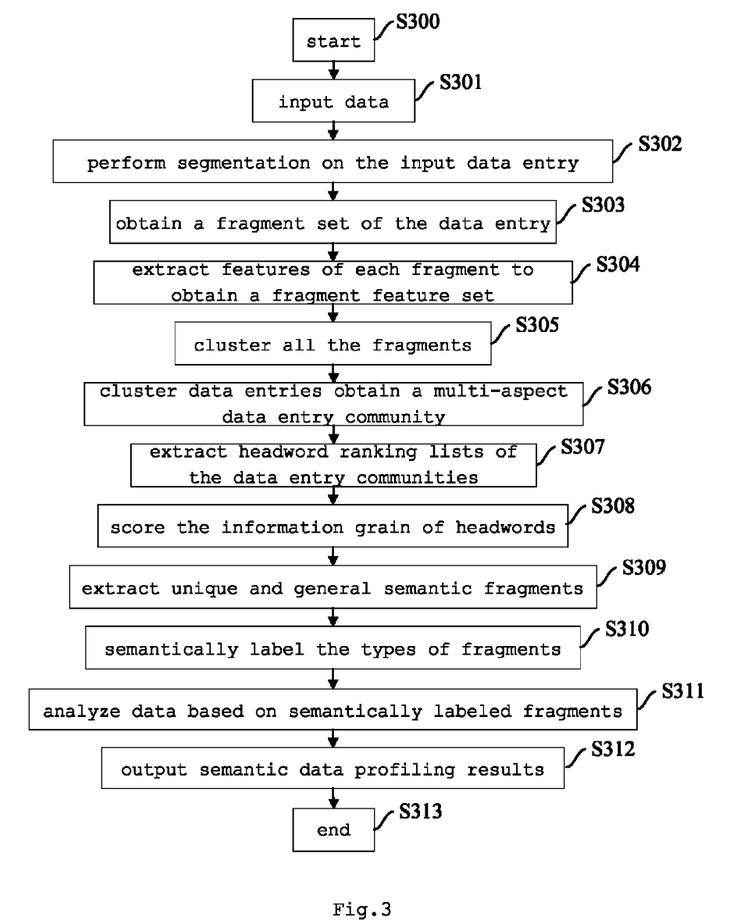
FIG. 3 illustrates a flowchart of a data profiling method according to an embodiment of the present invention.
Figure 4:
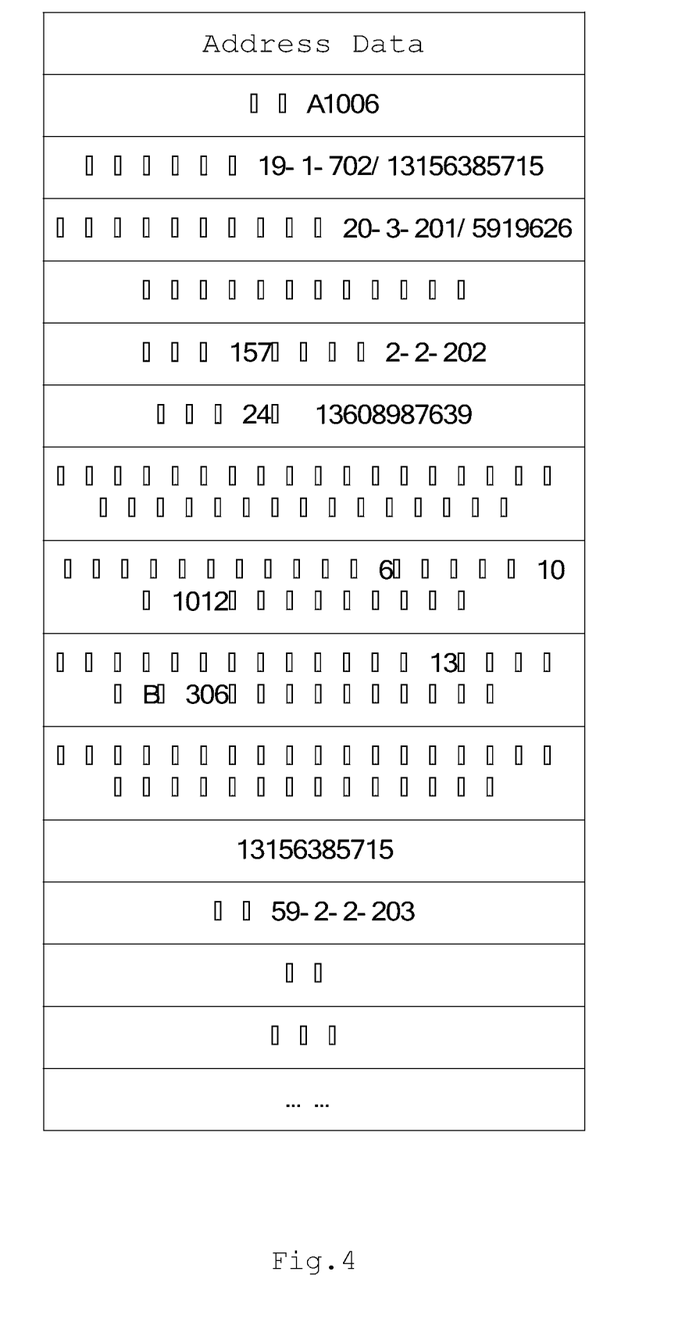
FIG. 4 illustrates an example of an input data entry set according to an embodiment of the present invention.

FIG. 3 illustrates a flowchart of a data profiling method according to the present invention. The method depicted in FIG. 3 starts with step S300. In step S301, data to be profiled is inputted from data input means 101. In the present embodiment, the data entry set depicted in FIG. 4 is input. Hereinafter, the method of the present invention will be illustrated with a data entry "北京西城区复兴门 外大街6号光 大大厦10 层 1012 光大银行国 际业务部" of the data entry set.

Then, data processing means 102 processes the data entry:

In step S302, semantic feature extracting means 201 performs segmentation on the input data entry to obtain segmentation results using the existing Chinese word-segmentation techniques, which results the following a plurality of segmentation units: "北京," "西城区," "复兴," "门," "外," "大街," "6," "号," "光," "大," "大厦," "10," "层," "1012," "光," "大," "银行," "国际" and "业务部." In step S303, a fragment set of the data entry is obtained according to the above segmentation units to achieve as much semantic information as possible about the data entry. In the present example, the obtained fragment set comprises "北京", "北京西城区", "北京西城区复 兴门外大街", "西城区", "西城区复 兴门外大街", "复兴门外大街", "大厦", "光大大 厦", "光大银行", "光大银行国际" "光大银行国际 业务部", "银行", "银行国际", "银行国际业务部", "国际", "国际业务部" and so on. In step S304, semantic features of each fragment in the fragment set of the data entries are extracted to obtain a fragment feature set comprising word unit set, character set, phrase set, fragment set, context fragment set, named entity attributes and so on.

Scoring means 202 scores the fragments based on the semantic features of the fragments of the data entries extracted from the semantic feature extracting means. First, in step S305, all the fragments are clustered based on the external neighboring fragments and the internal features in the corresponding data entries. Then, in step S306, scoring means 202 further clusters the data entries based on the above fragment clusters. Data entries are assigned to the same community if their one or more fragments are grouped into the same cluster. For example, given two data entries e1 and e2, and the fragments f(e1) and f(e2) which are extracted from data entries e1 and e2 respectively, if f(e1) and f(e2) are in the same cluster, then data entries e1 and e2 will be grouped into the same community. Since the fragments in a data entry describe different semantic information, they might be assigned to different clusters. Based on these fragment clusters, scoring means 202 identifies multi-aspect data entry communities which a data entry is involved in according to the entry type and the entry semantic features, so as to obtain the multi-aspect data entry communities.

In the present embodiment, the data entry "北京西城区复兴门外大街6号光 大大厦10 层 1012 光大银行国际业务部" can be assigned to multi-aspect data entry communities, such as "银行"-related industry community, "西城区"-related district community, "复兴门大街"-related location community, "大厦"-related spot community and so on.

Each community usually shares a theme. If most data entries in the same community contain some common word units, namely headwords, then these headwords may represent the community's theme. Therefore, a score of each word contained in a community is calculated in order to rank headwords. The score of each headword is defined as the sum of the scores of the feature weight of the headword in each data entry in the community. The score can measure the contribution each word makes to the assignment of these data entries to the current community. The headwords in a community can be ranked according to the scores, and the headword with a high score can be used as the community's theme tag.

In step S307, scoring means 202 extracts headword ranking lists of the data entry community, for example, headword ranking lists of some communities which the data entry "北京西城区复兴门 外大街6号光 大大厦10 层 1012 光大银行国 际业务部" is assigned to are as follows:

Headword list in the first community "复兴门大街"-related location community):
大街: 10.35795332070613
复兴: 7.556457078173965
门: 3.9872948842147444

Headword list in the second community ("银行"-related industry community):
"银行": 5.957950540781106
支行: 3.794889128759025

The above headword list in the first community is the "复兴门大街"-related location community in the multi-aspect data entry community, wherein "大街," "复兴" and 门 are all headwords in the first community, and the score of the headword 大街 is "10.35795332070613."

Next, in step S308, scoring means 202 scores the information grain of the headword based on the headword ranking lists of the corresponding data entry communities, i.e. scores the amount of information contained in the headword. Given C(e) is the data entry community set that the data entry e is involved in, and the community $C_j$ is a member in C(e). The common theme word list Headword($C_j$) of the community $C_j$ is defined by its top k headwords. Given a word unit $W_i$ in the data entry e, the information grain score Score(Wi,e) of the word unit $W_i$ is calculated as follows:

$$Score(W_i, e) = \frac{\sum_{C_j \in C(e) \& W_j \in Headword(C_j)} Weight(W_i, C_j) * Weight(C_j, e)}{CommunityNum(e)} \quad (1)$$

$$Weight(C_j, e) = \frac{CommunitySize(C_j)}{\sum_{C_i \in C(e)} CommunitySize(C_i)} \quad (2)$$

Where, Weight($W_i$, $C_j$) in equation (1) denotes the weight of word unit $W_i$ in Headword($C_j$), Weight($C_{j,e}$) denotes the weight of community $C_j$ in C(e), CommunitySize($C_i$) denotes the size of $C_i$ (i.e. the number of the data entries in the community), and CommunityNum(e) denotes the number of the communities which the data entry e is involved in.

In step S309, fragment labeling means 203 labels semantic fragments in each data entry based on the above scores and extracts unique and general semantic fragments. If the score of word unit $W_i$ in the data entry e is less than a predefined threshold, then word unit $W_i$ is a "unique information unit" in the data entry e, otherwise, word unit $W_i$ is a "general information unit" in the data entry e.

Top headwords in a larger data entry community usually indicate that they are more common semantic concepts and more independent of the specific data entries. All the general information units are labeled as independent fragments since they often occur in other data entries. All the continuous unique information units are merged into a larger unique semantic fragment. For example, in the data entries comprising organization, the general semantic fragments describe the general semantic features, e.g. office location, organization type etc., while the unique fragments describe the specific unique semantic features, e.g. focused industry, unique name etc.

Afterwards, in step S310, fragment labeling means 203 labels the type of a semantic fragment, i.e. semantic labels the fragment according to the semantic features such as address, organization suffix and other clues of each fragment. In the present embodiment, the semantic fragment labeling of "北京西城区复兴门外大街6号光大大厦10层1012光大银行国际业务部" is as follows: "北京"/City", "西城区"/District", "复兴门外大街/Street", "6 号/StreetNo", "光大大厦/Building", "10 层1012/RoomNo", "光大银行/Org" and "国际业务部/Department."

In step S311, data analyzing means 103 performs the following analysis based on the labeled semantic fragment: analyzes the distribution of semantic features in the data entry set, such as internal semantic structure features in the data entry set, expected semantic patterns, semantic pattern frequency, unexpected semantic patterns, invalid semantic constructions etc.; and analyzes the quality of the data entry set, such as expected data coverage, unexpected data types, invalid data values etc.

In step S312, analysis result output means 104 outputs results of data analyzing means 103 and obtains a semantic data profiling report. Finally, the method of the present invention ends in step S313.

Figure 5A:
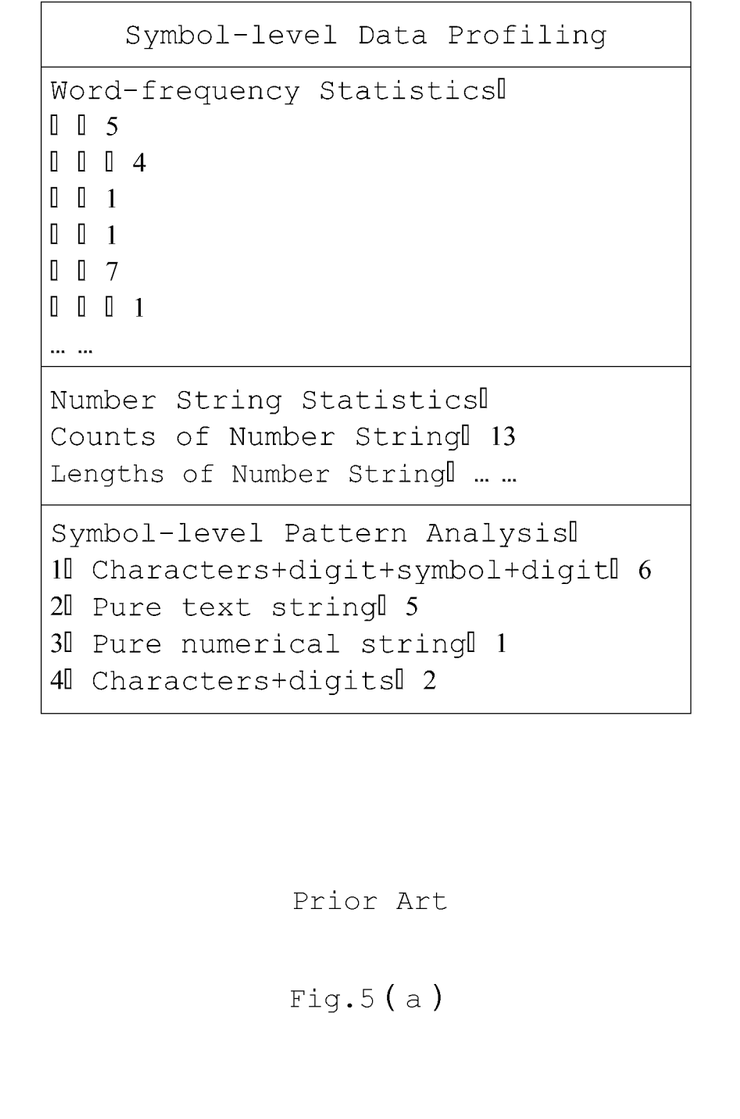
FIG. 5(a) illustrates a result obtained by applying the existing symbol-level data profiling method to the input data entry set depicted in FIG. 4.

FIG. 5(a) illustrates a result obtained by applying the existing symbol-level data profiling method to the input data entry set depicted in FIG. 4. For example, results obtained for a given data entry set by the existing symbol-level data profiling technique are as follows: 1) word-frequency statistics, for example, the occurrence frequency of "市" in the data entry set is 5; 2) numerical string statistics, for example, counts of numerical string are 13 (i.e. numerical string has occurred 13 times); 3)symbol-level pattern analysis, for example, 5 pure text strings, and the like. Apparently, it is unable to obtain related semantic analysis information using the symbol-level analysis pattern. For example, it is unable to know counts of street, counts of phone number, and counts of the mixture of data types such as location+contact number.

Figure 5B:
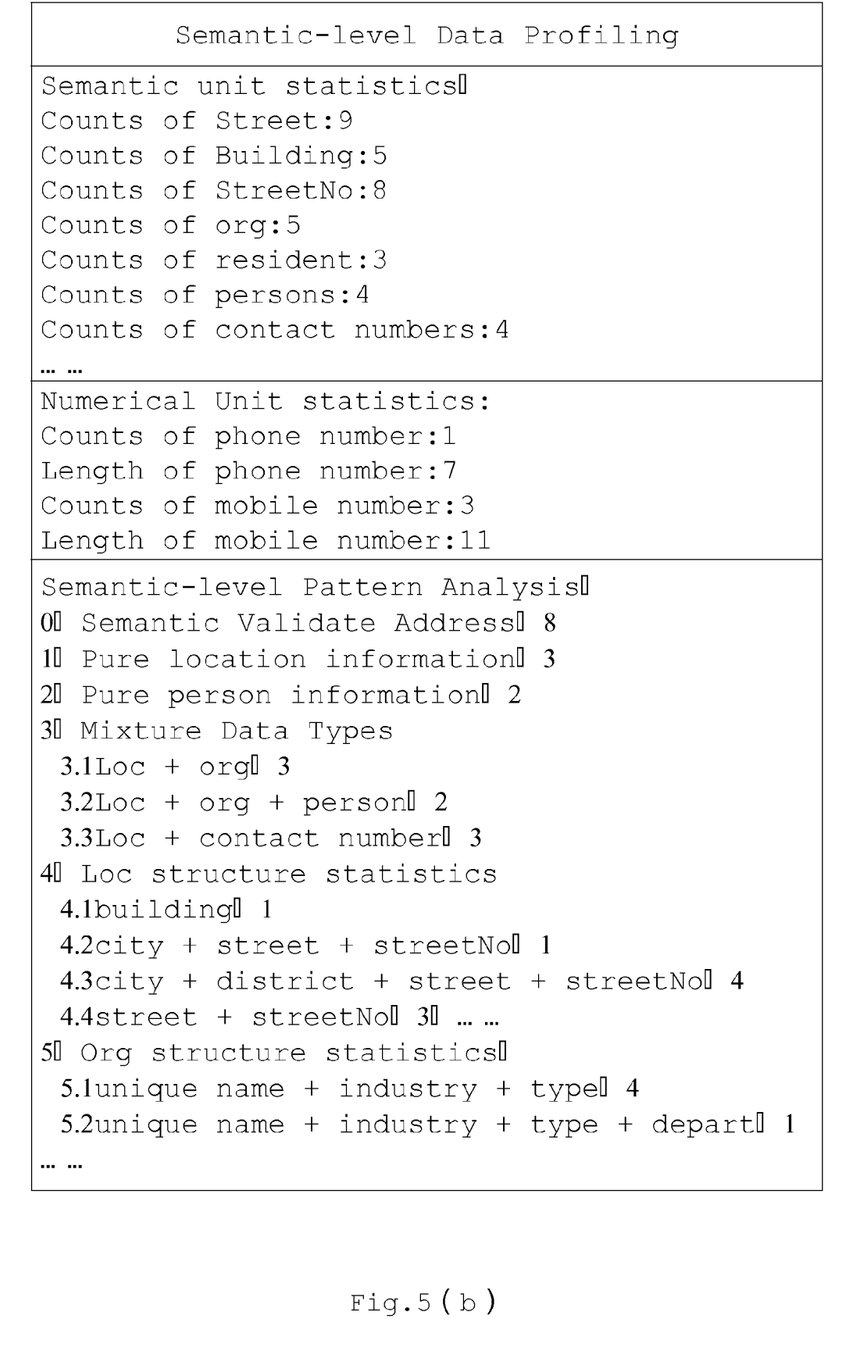
FIG. 5(b) illustrates a result obtained by applying the data profiling method according to an embodiment of the present invention to the input data entry set depicted in FIG. 4.

FIG. 5(b) illustrates a result obtained by applying the data profiling method according to an embodiment of the present invention to the input data entry set depicted in FIG. 4. Apparently, according to the present invention, semantic unit statistics results can be obtained, for example, counts of street are 9; numerical unit statistics, for example, counts of phone number are 1, length of phone number is 7, counts of mobile number are 3, and length of mobile number is 11; semantic-level pattern analysis, for example, the occurrence times of location+contact number are 3, and the like.

Thus, the semantic-level data profiling of the present invention is more suitable for free-text data entry sets and helps further data integration and data cleansing to understand new data sources. Moreover, the data profiling method and system of the present invention can further provide more detailed information and can be used to identify new data values that need to be further researched and possibly accommodated.

The present invention further relates to a computer program product. The computer program product comprises code for: reading an input data entry set, labeling semantic fragments according to the fragments of data entries and the semantic features of fragments; based on the labeled semantic fragments, performing a semantic-level data analysis on the input data entry set to obtain analysis results.

The computer program product as such may be stored in a storage carrier.

The specification of the present invention has been presented for purposes of illustration and description, and is not intended to be exhaustive or limited to the invention in the form disclosed. Many modifications and variations will be apparent to those of ordinary skill in the art.

For example, data processing means 102 may also use a named entity identification engine or some statistic methods to identify semantic fragments.

Therefore, the embodiments were chosen and described in order to best explain the principles of the invention, the practical application, and to enable others of ordinary skill in the art to understand that all modifications and alterations made without departing from the spirit of the present invention fall into the protection scope of the present invention as defined in the appended claims.

What is claimed is:

1. A non-transitory computer program storage device storing computer program product comprising program codes for performing the steps of a data profiling method for profiling new input data entries not previously processed for data profiling and data integration, wherein said method comprises the steps of:
an automatic data processing step of reading a new free-text input data entry set, extracting fragments of each input data entry, assigning semantic features to the fragments, and labeling semantic fragments of each of said input data entries according to said fragments and semantic features of said fragments, wherein said fragment comprises a token sequence representing an independent semantic concept and information unit; and
an automatic data analyzing step of, based on said labeled semantic fragments, performing a semantic-level data analysis on the input data entry set to obtain analysis results;
wherein the data processing step comprises:
a semantic feature extracting step of extracting the fragments of each input data entry and the semantic features of said fragments;
a scoring step of scoring said fragments according to the semantic features of said fragments; and
a fragment labeling step of labeling semantic fragments according to the scores of said fragments,
and wherein said scoring step further comprises:
clustering the data entries into a multi-aspect data entry community based on clustering of the fragments; and
scoring headwords of each data entry community of the multi-aspect data entry community,
wherein said scoring comprises, for a given word unit $W_i$ in a data entry e, calculating a score ($W_i$,e) by:

$$\text{Score}(W_i, e) = \frac{\sum_{C_j \in C(e) \& W_j \in Headword(C_j)} \text{Weight}(W_i, C_j) * \text{Weight}(C_j, e)}{CommunityNum(e)} \quad (1)$$

$$\text{Weight}(C_j, e) = \frac{CommunitySize(C_j)}{\sum_{C_i \in C(e)} CommunitySize(C_i)} \quad (2)$$

where, Weight($W_i$, $C_j$) in equation (1) denotes a weight of word unit $W_i$ in Headword($C_j$), Weight($C_j$,e) denotes a weight of community $C_j$ in C(e), CommunitySize($C_i$) denotes a number of data entries in the community $C_i$, and CommunityNum(e) denotes a number of communities in which the data entry e is involved.

2. A data profiling method for profiling new data input entries not previously processed for data profiling and data integration comprising:
an automatic data processing step of reading a new free-text input data entry set, extracting fragments of each input data entry, assigning semantic features to the fragments, and labeling semantic fragments of each of said input data entries according to said fragments and semantic features of said fragments, wherein said fragment comprises a token sequence representing an independent semantic concept and information unit; and
an automatic data analyzing step of, based on said labeled semantic fragments, performing a semantic-level data analysis on the input data entry set to obtain analysis results;
wherein the data processing step comprises:
a semantic feature extracting step of extracting the fragments of each input data entry and the semantic features of said fragments;
a scoring step of scoring said fragments according to the semantic features of said fragments; and
a fragment labeling step of labeling semantic fragments according to the scores of said fragments,
and wherein said scoring step further comprises:
clustering the data entries into a multi-aspect data entry community based on clustering of the fragments; and
scoring headwords of each data entry community of the multi-aspect data entry community,
wherein said scoring comprises, for a given word unit $W_i$ in a data entry e, calculating a score ($W_i$,e) by:

$$\text{Score}(W_i, e) = \frac{\sum_{C_j \in C(e) \& W_j \in Headword(C_j)} \text{Weight}(W_i, C_j) * \text{Weight}(C_j, e)}{CommunityNum(e)} \quad (1)$$

$$\text{Weight}(C_j, e) = \frac{CommunitySize(C_j)}{\sum_{C_i \in C(e)} CommunitySize(C_i)} \quad (2)$$

where, Weight($W_i$, $C_j$) in equation (1) denotes a weight of word unit $W_i$ in Headword($C_j$), Weight($C_j$,e) denotes a weight of community $C_j$ in C(e), CommunitySize($C_i$) denotes a number of data entries in the community $C_i$, and CommunityNum(e) denotes a number of communities in which the data entry e is involved.

3. The method according to claim 2, wherein said semantic feature extracting step further comprises:
performing segmentation on the input data entries to obtain a plurality of segmentation units;
obtaining a fragment set of said data entries according to said segmentation units; and
extracting the semantic features of each fragment in said fragment set to obtain a semantic feature set of said fragment set.

4. The method according to claim 2, wherein said fragment labeling step further comprises:
obtaining unique fragments and general fragments according to the scores of said fragments;
merging continuous unique fragments into a larger unique fragment; and
labeling semantic types of said fragments according to the semantic features of each fragment.

5. A computer data profiling system for profiling new input data entries not previously processed for data profiling and data integration comprising:
a central processing unit (CPU) for implementing processor and analyzer units;
a data processor unit for reading a new free-text input data entry set, extracting fragments of each input data entry, assigning semantic features to the fragments, and labeling semantic fragments of each of said input data entries according to said fragments and semantic features of said fragments, wherein said fragment comprises a token sequence representing an independent semantic concept and information unit; and
a data analyzer unit connected to said data processor unit and for, based on said labeled semantic fragments from the data processor unit, performing a semantic-level data analysis on the input data entry set to obtain analysis results;

wherein said data processor unit operates on components comprises:

semantic feature extracting component for extracting the fragments of each input data entry and the semantic features of said fragments;

scoring component connected with said semantic feature extracting component and for scoring said fragments according to the semantic features of said fragments from said semantic feature extracting component; and fragment labeling component connected with said scoring component and for labeling semantic fragments according to the scores of said fragments from said scoring component, and wherein said scoring component further comprises:

data entry clustering component for clustering the data entries into a multi-aspect data entry community based on clustering of the fragments; and headword scoring component for scoring headwords of each data entry community of the multi-aspect data entry community, wherein said scoring component calculates, for a given word unit $W_i$ in a data entry e, a score $(W_i, e)$ by:

$$\text{Score}(W_i, e) = \frac{\sum_{C_j \in C(e) \& W_j \in Headword(C_j)} \text{Weight}(W_i, C_j) * \text{Weight}(C_j, e)}{CommunityNum(e)} \quad (1)$$

$$\text{Weight}(C_j, e) = \frac{CommunitySize(C_j)}{\sum_{C_i \in C(e)} CommunitySize(C_i)} \quad (2)$$

where, Weight($W_i$, $C_j$) in equation (1) denotes a weight of word unit $W_i$ in Headword($C_j$), Weight($C_j$,e) denotes a weight of community $C_j$ in C(e), CommunitySize($C_i$) denotes a number of data entries in the community $C_i$, and CommunityNum(e) denotes a number of communities in which the data entry e is involved.

6. The system according to claim 5, wherein said semantic feature extracting component further comprises:

segmentation component for performing segmentation on the input data entries to obtain a plurality of segmentation units;

fragmentation component for obtaining a fragment set of said data entries according to said segmentation units; and semantic feature extraction component for extracting the semantic features of each fragment in said fragment set to obtain a semantic feature set of said fragment set.

7. The system according to claim 5, wherein said fragment labeling component further comprises:

fragment identifying component for obtaining unique fragments and general fragments according to the scores of said fragments;

merging component for merging continuous unique fragments into a larger unique fragment; and semantic labeling component for semantically labeling types of said fragments according to the semantic features of each fragment.

\* \* \* \* \*